United States Patent [19]

Campanile et al.

[11] 4,340,400
[45] Jul. 20, 1982

[54] FLUIDIZED BED FILTERING AND/OR HEAT EXCHANGE APPARATUS PARTICULARLY FOR GASEOUS DISCHARGES FROM INTERNAL COMBUSTION ENGINES AND INDUSTRIAL PLANTS

[75] Inventors: Armando Campanile, Turin; Giovanni M. Carlomagno, Naples; Angelo De Vita, Moio della Civitella; Giorgio Donsi, Naples; Leopoldo Massimilla, N,ples; Agostino Scognamiglio, Naples, all of Italy

[73] Assignees: Centro Ricerche Fiat S.p.A., Turin; Universita' Degli Studi di Napoli, Naples, both of Italy

[21] Appl. No.: 300,528

[22] Filed: Sep. 9, 1981

[30] Foreign Application Priority Data

Sep. 10, 1980 [IT] Italy .............................. 53499/80[U]

[51] Int. Cl.³ ............................................. B01D 51/00
[52] U.S. Cl. ......................................... 55/269; 55/99;
   55/479; 55/337; 55/342; 165/104.16;
   165/104.18; 60/311
[58] Field of Search ...................... 55/98, 99, 80, 268,
   55/269, 337, 342, 79, 390, 474, 479, DIG. 30;
   165/104.18, 104.16; 422/177, 178; 60/311, 320

[56] References Cited

U.S. PATENT DOCUMENTS

| | | | |
|---|---|---|---|
| 3,621,639 | 11/1971 | Edwards et al. | 55/269 |
| 3,814,176 | 6/1974 | Seth | 165/104.16 |
| 4,120,668 | 10/1978 | Fraley | 55/269 |
| 4,158,385 | 6/1979 | Vandenhoeck | 165/104.18 |
| 4,274,478 | 6/1981 | Stendahl | 165/104.16 |

FOREIGN PATENT DOCUMENTS

| | | | |
|---|---|---|---|
| 2836772 | 2/1980 | Fed. Rep. of Germany | 422/177 |
| 55-137023 | 10/1980 | Japan | 55/479 |
| 108445 | 11/1958 | Pakistan | 165/104.16 |

*Primary Examiner*—Bernard Nozick
*Attorney, Agent, or Firm*—Sughrue, Mion, Zinn, Macpeak & Seas

[57] ABSTRACT

A fluidized bed filtering and heat exchange apparatus particularly for treating gaseous discharges from internal combustion engines and industrial plants comprises a vertical-axis elongated casing (10) having a filler of inert, particulate material therein, a gas feed manifold (36) provided with discharge nozzles arranged to direct gas downwardly into said casing (10) to maintain said filler in a fluidized state, and a cyclone (58) communicating with the upper part of said casing (10) to receive said gas therefrom and to separate agglomerated particles from said gas. Heat-exchange means are provided for cooling the fluidized filler including a plurality of tubes (46) for carrying a heat-exchange fluid therethrough.

16 Claims, 7 Drawing Figures

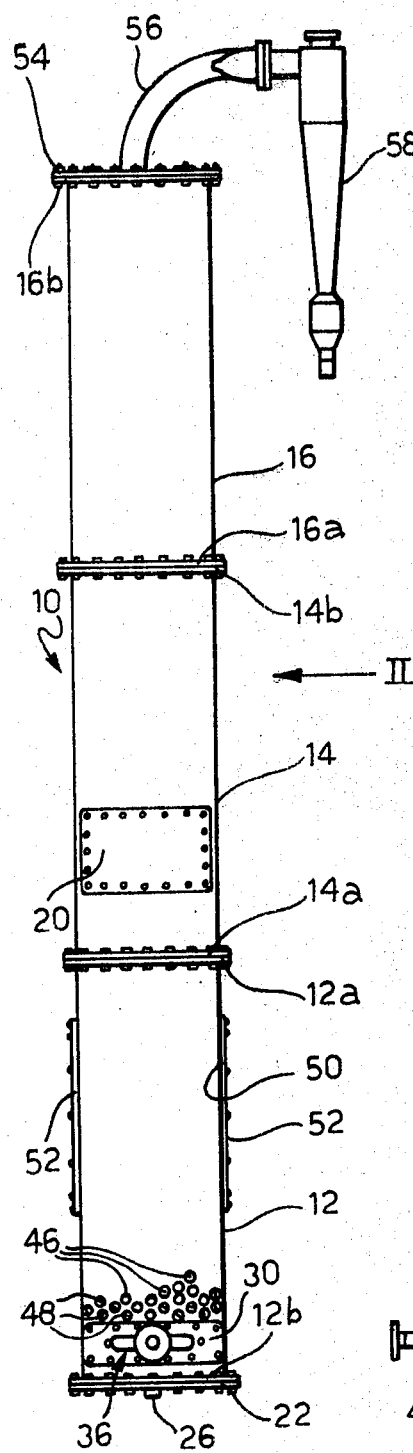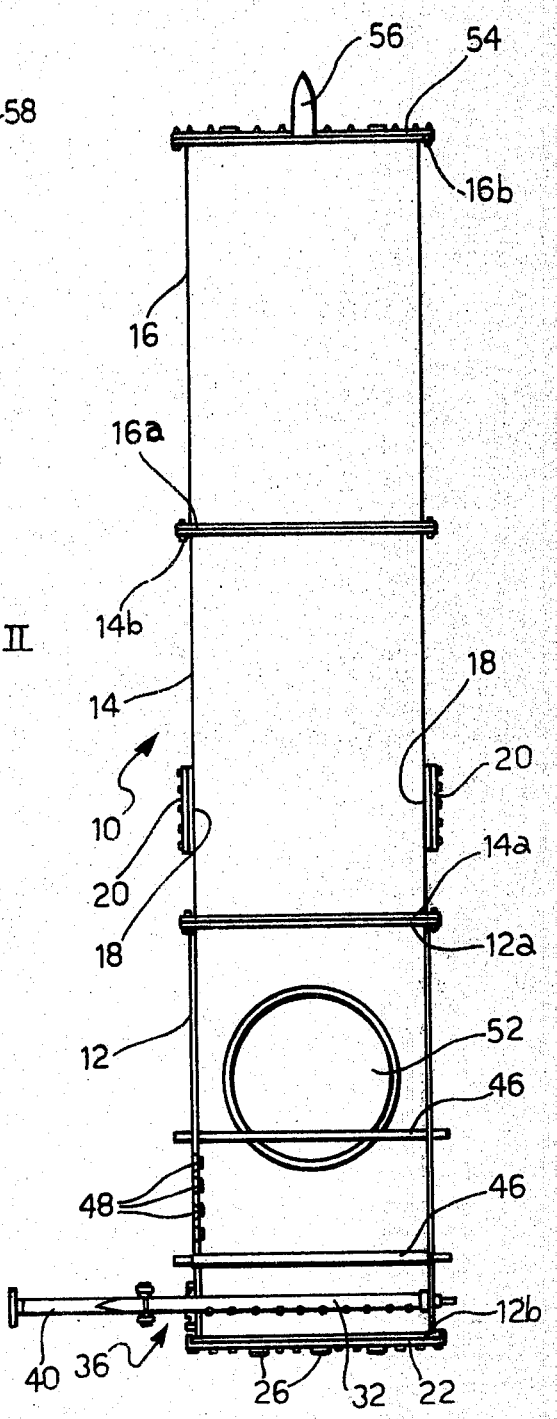

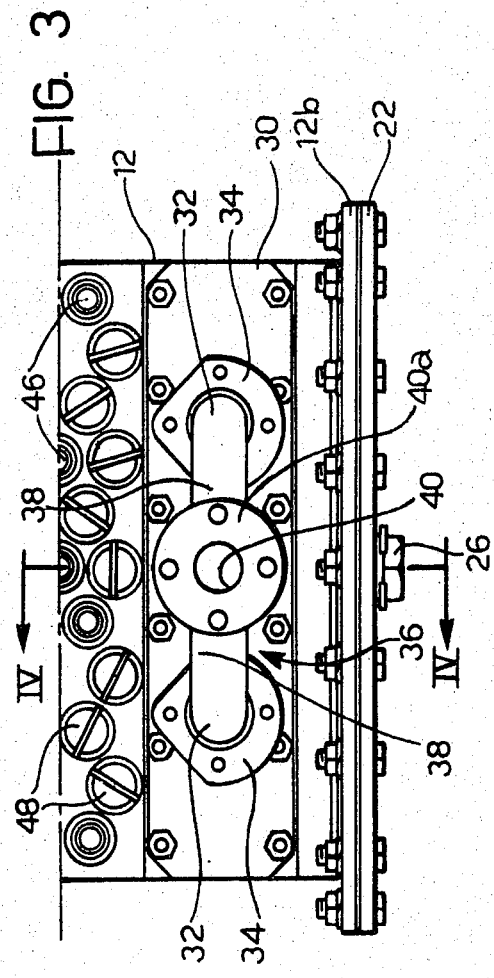
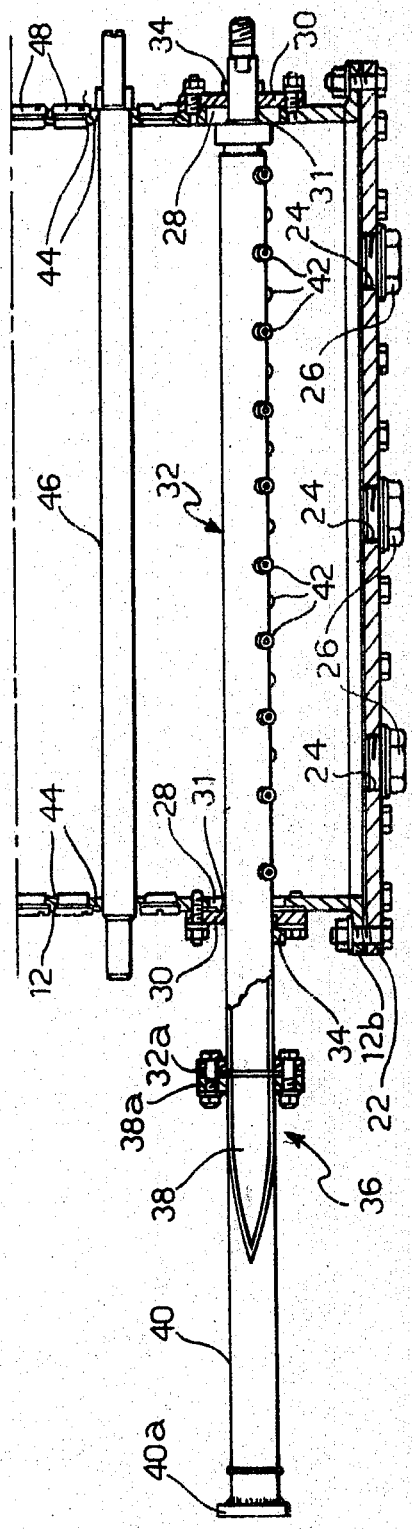

FLUIDIZED BED FILTERING AND/OR HEAT EXCHANGE APPARATUS PARTICULARLY FOR GASEOUS DISCHARGES FROM INTERNAL COMBUSTION ENGINES AND INDUSTRIAL PLANTS

The present invention relates to fluidised-bed filtering and/or heat exchange apparatus for capturing dispersed particles and recovering heat from gaseous discharges from internal combustion engines and industrial plants.

The recovery of some of the waste heat released into the atmosphere by hot gaseous discharges from combustion engines and numerous industrial processes is one of the objectives most vigorously pursued in the field of energy conservation planning, given the vastness of the potential source of energy available for use.

Until now, the practice of recovering heat from gaseous discharges has never been widely used because of the many difficulties encountered in treating these gases, which, in the majority of cases, contain considerable quantities of dirt and corrosive agents. The dirtying of the heat exchange surfaces, which in certain cases also involves corrosive attack on these surfaces, is a severe limitation to the use of conventional heat recovery equipment in such applications.

The technique of fluidisation, which is widely used in chemical plant engineering and in the treatment of minerals, has also been introduced into other fields in which advantage can be taken of the benefits offered by fluidisation, for example, in heat-treatment ovens, incinerators etc.

More recently, the renewed interest in the use of coal and residual fuels and in the recovery of waste heat has favoured the development of fluid-bed combustion chambers and heat exchangers.

The object of the present invention is to provide fluidised-bed apparatus which is able to operate mainly as a filter in the initial saturation phase and as an aerosol agglomerator and heat exchanger under steady operating conditions, and which is highly efficient with regard to heat recovery, removal of the dispersed phases entrained in the exhaust gas and self-cleaning of the heat-exchange surfaces.

In order to achieve this object, the present invention provides fluidised-bed filtering and/or heat exchange apparatus, particularly for treating gaseous discharges from internal combustion engines and industrial plants, the main characteristic of which lies in the fact that it comprises, in combination:

a vertical-axis cylindrical or prismatic casing containing a filler of inert, particulate material, a feed manifold inserted in the lower part of the casing for passing a gas to be treated thereinto, the gas being able to pass upwardly through the casing and maintain the inert material in a fluidised state, the said manifold including at least one distributor duct disposed transverse the axis of the casing and provided with a plurality of radial discharge nozzles spaced apart and directed towards the bottom of the casing, a cyclone connected to the upper part of the casing for collecting and separating agglomerates of particles entrained in the gas leaving the casing, and heat-exchange means for cooling the fluidised bed comprising a plurality of tubes for carrying a heat-exchange fluid, the said tubes passing through the casing transverse the axis thereof and being situated in zones of the casing such as to be totally immersed in the fluidised bed during operation of the apparatus.

As a result of this characteristic, the apparatus of the invention is able to give extremely high yields both as regards heat recovery, thanks to the high coefficients of heat exchange characteristic of fluidised beds and the almost total absence of deposits on the heat exchange surfaces, and with regard to the filtering action of the fluidised bed, thanks to the capacity of the fluidised solid to capture substances in the treated gas which can be condensed. The fluidised bed acts as an intermediate stage between the gas distributor and the cyclone and enables the minutest particles entrained by the gas to be absorbed by forming them into agglomerates which, at the outlet of the casing, have much larger dimensions than the original particles and can thus be separated in the cyclone. In practice, the entire fluidised-bed/cyclone combination is able to collect up to 100% of the substances suspended in the gaseous discharge if the inert material constituting the fluidised mass and its grain size are suitably chosen. The nature and the grain size of the inert material constituting the bed must be chosen so as to optimise the intended operational conditions of the apparatus which it is to achieve. The inert material may, for example, consist of silica sand, small glass balls, zircon powder and the like, with grain sizes which may vary between one hundred and one thousand microns. A suitable choice of the inert material enables the abrasion of the surfaces exposed to its action as well as the self-grinding of the material itself, and hence the need to renew the bed, to be minimised and also influences the selectivity of the bed with regard to the chemical species absorbed.

The use of a multiple-nozzle distributor for introducing the gas to be treated into the casing has the advantage, over conventional apparatus with plate distributors, of minimising the accumulation of solid particles in the orifices through which the gas to be treated is discharged and of effecting a rapid dispersion of the gas itself at the base of the casing and, to a lesser extent, of the bed. The higher velocities of the gas and the consequent filler losses are compensated for by the guarantee of a more homogeneous distribution and more stable operation of the apparatus. A distributor of this type can, moreover, effectively be thermally insulated from the fluidised bed, in contrast to distributors of conventional apparatus, so that, for colder gases, the agglomeration of particles present in finely dispersed form in the gas itself is deferred until within the bed.

According to the invention, the discharge nozzles of the distributor are in the form of elongate, axially-converging, jet nozzles and are preferably disposed on the distributor duct in opposed, axial rows of nozzles. Moreover, the nozzles of each row are staggered with respect to the nozzles of the other row and their axes are preferably inclined downwardly at an angle of between 50° and 70°, preferably 60°, to a vertical plane passing through the axis of the distributor duct.

The particular conformation of the discharge nozzles, in addition to the advantages of avoiding the deposition of grime in the gas discharge openings and of preventing the inert material from entering into the feed manifold under all conditions, has the advantage of ensuring that the gas has a sufficiently high discharge velocity to facilitate intense capture of particles by the inert material by direct collision in the zone of the jets, but not so high as to perforate the bed causing excessive grinding of the inert material constituting the bed itself.

Preferably the feed manifold includes two distributor ducts located side by side.

Thanks to this characteristic, it is possible to achieve the optimum fluid-dynamic conditions during operation of the apparatus, with the effect that a stationary state is reached as regards the capture of particles from the gas, whereby the quantity of filtered substance present in the fluidised bed remains constant and everything which is captured is given up to the cyclone with a different size range.

According to a further characteristic of the invention, the heat-exchange tubes for cooling the fluidised bed are carried by the casing and are rapidly releasable therefrom.

Thus it is possible to achieve substantial flexibility of the apparatus in use by varying the size of the heat-exchange surfaces at will according to the main purpose of the apparatus, whether that of heat recovery or of removing the particles and other agents entrained in the treated gas.

According to the present invention, each of the said tubes passes through, and is sealed in a pair of coaxial holes formed in the side walls of the casing and is provided with closure means for stopping the said holes when the tubes are dismantled. Preferably the holes in the casing are screw-threaded and the closure means consist of simple screw plugs.

Further characteristics and advantages of the invention will become evident during the description which follows, with reference to the appended drawings provided by way of non-limiting example, in which:

FIG. 1 is a side elevational view of apparatus according to the invention,

FIG. 2 is a partially-sectioned side view taken on arrow II of FIG. 1.

FIG. 3 illustrates a detail of FIG. 1 on an enlarged scale,

FIG. 4 is a section taken on line IV—IV of FIG. 3,

Figure 5:
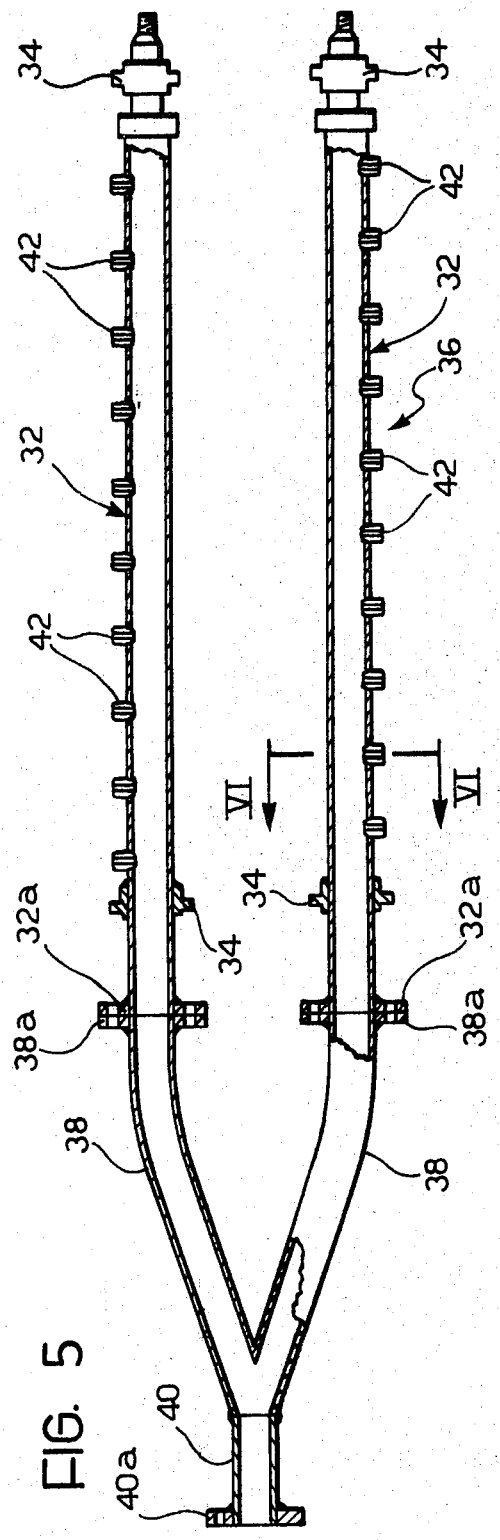
FIG. 5 is a partially-sectioned plan view of a detail of FIG. 4.

Referring to FIGS. 1 and 2, the apparatus according to the invention consists essentially of a vertical-axis, prismatic casing 10 having a rectangular cross section. The casing 10 includes a lower section 12, an intermediate section 14 and an upper section 16. The intermediate section 14 is provided at its ends with external flanges 14a, 14b fixed by respective bolts to corresponding flanges 12a, 16a of the sections 12 and 16 and is further provided, in its smaller faces, with a facing pair of inspection apertures 18 closed by rectangular plates 20.

The lower section 12 has an external flange 12b at its lower end to which a plate 22, constituting the bottom of the casing 10, is bolted. As illustrated in detail in FIG. 4, the plate 22 has a plurality of screw-threaded holes 24, constituting discharge openings, into each of which is screwed a screw-threaded plug 26.

A pair of rectangular apertures 28 are formed facing each other in the smaller side faces of the lower section 12, at a short distance from the bottom 22; a support plate 30 is screwed over each aperture 28. Each support plate 30 has a pair of holes 31, located side by side, in which the ends of two distributor ducts 32, which pass through the casing 10 transverse the axis thereof, are sealed. The two distributor ducts 32 are sealed to the plates 30 by means of flanged gaskets 34. As illustrated in detail in FIG. 5, the two distributor ducts 32 form part of a feed manifold 36 through which gas to be treated is introduced into the casing 10. The ducts 32 are in fact stopped at one end and are provided at their other ends with peripheral flanges 32a bolted to corresponding flanges 38a of a pair of tubular connectors 38 branching from a single feed duct 40. The feed duct 40 has a connecting flange 40a for connection, in use, to a discharge duct for the gaseous discharge from an internal combustion engine or an industrial plant.

Figure 6:
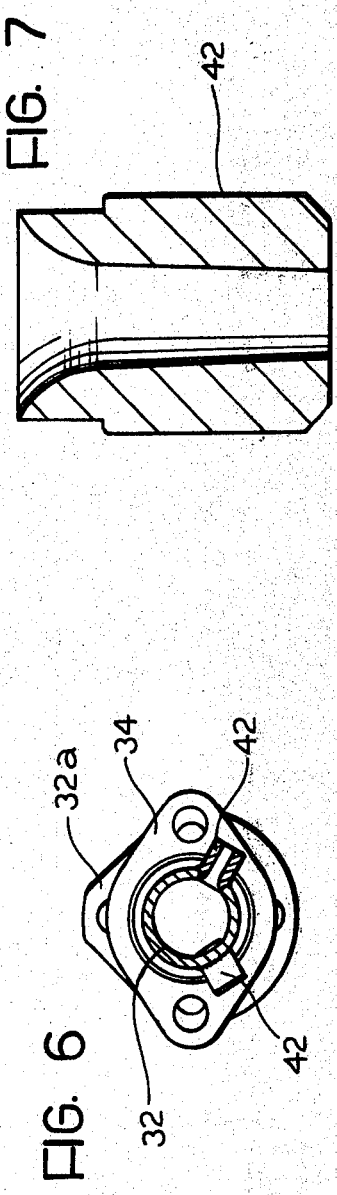
FIG. 6 is a transverse sectional view, on an enlarged scale, taken on line IV—IV of FIG. 5.

As is clearly illustrated in FIGS. 4 to 6, each distributor duct 32 has a plurality of radial discharge nozzle 42 spaced from each other and disposed in two axial rows. The nozzles 42 of each row are staggered with respect to the nozzles 42 of the other row and have their axes inclined downwardly, at an angle of about 60°, to a vertical plane passing through the axis of the duct 32.

Figure 7:
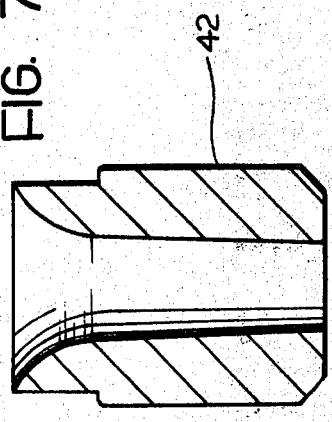
FIG. 7 illustrates a detail of FIGS. 5 and 6 on an enlarged scale.

Each discharge nozzle 42 is constituted, as illustrated in greater detail in FIG. 7, by an elongate, axially-converging jet nozzle.

The smaller faces of the lower section 12 are formed, starting from a level immediately above the distributor ducts 32, with a plurality of pairs of coaxial, screw-threaded holes 44 arranged to allow the passage of heat-exchange tubes 46, which are sealed in the holes 44, through the casing 10 parallel to the distributor ducts 32. The tubes 46, the ends of which may be connected in a manner known per se to tube plates, not shown, are used to carry a heat-exchange fluid which can take up heat within the apparatus. The tubes 46 may be grouped in tube bundles distributed throughout the height of the casing 10. The number of tubes 46 may be varied at will according to whether the apparatus is to be used mainly as a filtering device or mainly as a heat exchange device. The pairs of holes 44 which are not used for the passage of tubes 46 are stopped by means of simple screw-threaded plugs 48. In the example illustrated, the tubes 46 could however be provided with external finning which can improve their heat-exchange capacity. Moreover, when the apparatus is to be used mainly as a heat exchanger, the casing 10 may be provided with external radiant elements not illustrated in the drawings.

The larger side faces of the lower section 12 of the casing 10 have a pair of circular apertures 50 facing each other and each of which is closed by a transparent inspection window 52.

The upper section 16 of the casing 10 has an external flange 16b at its upper end to which is fixed a closure plate 54 serving as a lid and carrying a curved duct 56 which connects the interior of the casing 10 to a cyclone 58, of conventional type, which can collect and separate solid particles entrained in the treated gas leaving the casing 10.

The casing 10 may also be provided internally with perforated transverse septa or grids, not illustrated, to subdivide the apparatus into several stages. In addition, the casing 10 may be provided with an intermediate, flared wall section, not illustrated in the drawings, in order to slow the gaseous current so as to reduce the entrainment of fine particles.

Within the casing 10 is a filler of inert particulate material which, during operation of the apparatus, is maintained in a fluidised state by the gas introduced into the casing 10 through the distributor ducts 32. The quantity of inert material is such that, when the bed is completely expanded, the heat exchange tubes 46 are totally immersed. The nature and the grain size of the inert material constituting the bed must be chosen so as to optimise the operating conditions which it is intended to achieve within the apparatus. The inert material may consist of silica sand, small glass balls, zircon powder and the like, with a grain size which can vary between 100 and 1000 microns. The filler of inert material may be renewed by draining the exhausted material through the discharge openings 24 in the bottom 22 of the casing 10, or, alternatively, a device, not illustrated, for regenerating the filler continuously may be provided.

In use, the apparatus according to the invention acts mainly as a filter during the initial saturation state while in the steady state it may operate simultaneously as an aerosol agglomerator, capturing the solid particles dispersed in the gas to be treated, and as a heat recoverer, through heat exchange between the fluidised bed and the fluid which flows through the tubes 46 and the optional external radiant elements with which the casing 10 may be provided. The fluidised bed acts as an intermediate stage between the distributor ducts 32 and the cyclone 58, providing for the absorption of the smallest particles and other aerosols entrained in the gas to be treated, giving up agglomerates with considerably larger dimensions than the original particles and which are thus separable within the cyclone 58. With a suitable choice of the inert material constituting the fluidised mass and the grain size of this material, the fluidised-bed/cyclone combination is able to collect up to 100% of the substance suspended in the treated gas.

The particular shape of the feed manifold 36, and particularly of the discharge nozzles 42, allows a rapid dispersion of the fluidising medium to be achieved within the bed, with the guarantee of a homogeneous distribution and stable operation. The axial dimensions of the nozzles 42 prevent the entry of inert material into the manifold 36 under all operational conditions of the apparatus.

A further important advantage of the conformation of the manifold 36 lies in the fact that it allows the manifold to be effectively thermally insulated from the fluidised bed so as to defer the agglomerisation of particles dispersed in the gas until within the bed itself on lowering of the temperature.

The apparatus according to the invention achieves a high efficiency with regard to heat recovery, thanks to the high coefficients of heat exchange characteristic of fluidised beds, with the advantage of heat exchange surfaces which are almost completely free from deposits. As stated above, the number of heat-exchange tubes 46 may be varied at will, according to the purpose of the apparatus itself.

From the above description it is clear that the apparatus according to the invention, as well as having a particularly simple and compact structure, achieves highly efficient separation with short fluidised beds thanks to the high relative velocity between the gas jets to be treated and the fluidised particles close to the distributor ducts 32, and ensures a wide flexibility of use on variation of the aerosol characteristics.

A carbon-powder combustion chamber may be connected to the apparatus of the invention in order to burn the combustible agglomerate particles separated within the cyclone 50 at the end of the treatment.

Of the multiplicity of possible uses of the apparatus according to the invention the following may be cited: steam generator, self-cleaning heat exchanger able to treat discharged waste gases from industrial processes a heat exchanger for solar energy boilers with focusing, heat recovery in total-energy cogenerating systems operated by diesel-cycle engines with the recovery of heat of combustion of the components, anti-polluting exhaust silencers for internal combustion engines, after burners for exhaust silencers of internal combustion engines.

What is claimed is:

1. Fluidised bed filtering and heat exchange apparatus particularly for treating gaseous discharges from internal combustion engines and industrial plants, comprising in combination:

an elongate casing arranged with its longitudinal axis vertical;

a filler of inert, particulate material within said casing;

a gas-feed manifold associated with a lower part of said casing and including at least one distributor duct extending within said casing transverse said axis and a plurality of discharge nozzles spaced apart along said duct and arranged to direct gas fed to said duct downwardly into said casing, whereby, in use, said gas flows upwardly through said casing from said lower part to maintain said filler in a fluidised state;

a cyclone communicating with an upper part of said casing to receive said gas therefrom and to separate agglomerated particles from said gas; and heat-exchange means for cooling the fluidised filler including a plurality of tubes for carrying a heat-exchange fluid, said tubes extending through said casing transverse said axis and being located in said casing so as to be totally immersed in said fluidised filler in use of the apparatus.

2. Apparatus as claimed in claim 1, wherein said feed manifold includes two said distributor ducts located side by side.

3. Apparatus as claimed in claim 1, wherein said casing has a bottom wall defining a discharge opening.

4. Apparatus as claimed in claim 1, wherein said filler of inert material has a grain size of between 100 and 1000 microns.

5. Apparatus as claimed in claim 4, wherein said filler of inert material consists of small glass balls.

6. Apparatus as claimed in claim 4, wherein said filler of inert material consists of silica sand.

7. Apparatus as claimed in claim 4, wherein said filler of inert material consists of zircon powder.

8. Apparatus as claimed in claim 1, wherein said discharge nozzles are in the form of converging jet nozzles.

9. Apparatus as claimed in claim 8, wherein said jet nozzles are axially elongate.

10. Apparatus as claimed in claim 1, wherein said discharge nozzles are arranged in two opposed rows each extending axially of said distributor duct.

11. Apparatus as claimed in claim 10, wherein the discharge nozzles of one row of said two rows are staggered with respect to the discharge nozzles of the other row of said two rows.

12. Apparatus as claimed in claim 10, wherein the axes of the discharge nozzles of each row are inclined downwardly at an angle of between 50° and 70°, preferably 60°, with respect to a vertical plane passing through the axis of the distributor duct.

13. Apparatus as claimed in claim 1, wherein said heat-exchange tubes are supported by said casing and are rapidly releasable therefrom.

14. Apparatus as claimed in claim 13, wherein opposite side wall portions of the lower part of said casing define pairs of coaxial holes, each of said heat-exchange tubes passes through a respective pair of said holes and is sealed to said wall portions around said holes, and wherein closure means are provided for stopping said holes when said tubes are removed therefrom.

15. Apparatus as claimed in claim 14, wherein said holes are screw threaded and said closure means consist of screw-threaded plugs.

16. Apparatus as claimed in claim 13 wherein said heat exchange tubes are grouped in tube bundles distributed through the height of said casing.

* * * * *